(12) United States Patent
Seibt

(10) Patent No.: US 8,185,977 B2
(45) Date of Patent: May 29, 2012

(54) SYSTEM FOR FLUSHING OF A VACUUM TOILET IN AN AIRCRAFT

(75) Inventor: Christian Seibt, Buchholz (DE)

(73) Assignee: Airbus Operations GmbH (DE)

( * ) Notice: Subject to any disclaimer, the term of this patent is extended or adjusted under 35 U.S.C. 154(b) by 1155 days.

(21) Appl. No.: 12/012,238

(22) Filed: Jan. 31, 2008

(65) Prior Publication Data

US 2008/0185477 A1 Aug. 7, 2008

Related U.S. Application Data

(60) Provisional application No. 60/898,657, filed on Jan. 31, 2007.

(30) Foreign Application Priority Data

Jan. 31, 2007 (DE) .......................... 10 2007 004 831

(51) Int. Cl.
*E03D 11/00* (2006.01)
*E03D 13/00* (2006.01)
*E03D 1/34* (2006.01)

(52) U.S. Cl. .......................... 4/431; 4/434; 4/305; 4/378

(58) Field of Classification Search ............... 4/378, 321, 4/323, 431–442, DIG. 9, 422, 423, 424, 313, 4/305, 302, 304

See application file for complete search history.

(56) References Cited

U.S. PATENT DOCUMENTS

| | | | | |
|---|---|---|---|---|
| 3,578,885 | A | | 5/1971 | Alton |
| 4,304,740 | A | * | 12/1981 | Cernoch ..................... 261/121.1 |
| 4,713,847 | A | * | 12/1987 | Oldfelt et al. ..................... 4/316 |
| 5,604,938 | A | * | 2/1997 | Tyler ................................. 4/321 |
| 6,006,373 | A | * | 12/1999 | Hoang ............................... 4/431 |
| 6,216,285 | B1 | * | 4/2001 | Olin .................................. 4/431 |
| 6,370,709 | B1 | * | 4/2002 | Stradinger et al. ................. 4/434 |
| 6,732,386 | B2 | * | 5/2004 | Anderson et al. ................. 4/431 |
| 7,063,455 | B2 | * | 6/2006 | Achkire et al. ............. 366/152.2 |
| 2006/0237373 | A1 | * | 10/2006 | Zinn ............................. 210/741 |

FOREIGN PATENT DOCUMENTS

| | | |
|---|---|---|
| DE | 4131367 | 3/1993 |
| DE | 102006016030 | 10/2007 |
| EP | 1013838 | 6/2000 |
| EP | 1270832 | 1/2003 |
| EP | 1340861 | 9/2003 |

* cited by examiner

*Primary Examiner* — Jason J Boeckmann
*Assistant Examiner* — Justin Jonaitis
(74) *Attorney, Agent, or Firm* — Lerner, David, Littenberg, Krumholz & Mentlik, LLP

(57) ABSTRACT

A system for flushing a vacuum toilet, includes a drain that is connected to a drain conduit, which vacuum toilet is connectable to a vacuum system by way of a suction valve. With the use of a combined valve including, for example, a flow-optimised intermediate storage device, inflow nozzle, bypass conduit with silencer and hose odor seal, the flow noises at the urinal bowl drain, urinal bowl overflow and upper end of the bypass conduit can be effectively suppressed. With the combination disc valve or the shut-off valve and suction valve, during the suction process the air stream is only drawn through the bypass conduit with a special odor seal and silencer.

17 Claims, 5 Drawing Sheets

SYSTEM FOR FLUSHING OF A VACUUM TOILET IN AN AIRCRAFT

CROSS-REFERENCE TO RELATED APPLICATIONS

This application claims the benefit of the filing date of U.S. Provisional Patent Application No. 60/898,657 filed Jan. 31, 2008, the disclosure of which is hereby incorporated herein by reference.

BACKGROUND OF THE INVENTION

The invention relates to a system for flushing a vacuum toilet, in particular a system for flushing a vacuum toilet in an aircraft, to a corresponding aircraft, to a method for operating a corresponding system, to a program element for implementing the method, and to a corresponding storage medium.

Known flushing devices for a vacuum toilet with, for example, a urinal require that after use of the urinal a flushing process is initiated by actuating a triggering device. This is then followed by the supply of flushing liquid to the urinal and subsequent opening of a suction valve, so as to lead urine, flushing liquid and any other impurities into the region of a waste water tank. In this arrangement the transport process usually takes place by a pressure differential between the waste water tank and the place of installation of the vacuum toilet. In conventional systems for flushing a vacuum toilet, during the flushing process there is considerable noise emission as a result of the airflows caused by the flushing process, which noise emission can be still further magnified by a funnel effect of the urinal bowl.

SUMMARY OF THE INVENTION

There maybe a need to provide a system for flushing a vacuum toilet, which system reduces the noise emission and the odour emission that occur.

According to an embodiment of the invention, a drain system for a vacuum toilet for an aircraft is provided, wherein the drain system comprises a drain pipe system with at least a first pipe section and a second pipe section that is connected to the first pipe section, wherein a connection of the first pipe section is connectable to a bowl of a vacuum toilet, and a connection of the second pipe section is connectable to a vacuum system, a first closing device that is provided in the first pipe section, and a second closing device that is provided in the second pipe section downstream of the first closing device, wherein the first closing device and the second closing device are coupled to each other such that in each instance only one of the first and of the second closing devices can be open.

This makes possible defined coordination, as required, of the flushing- and suction processes. Furthermore, such a system and the components used in the system are optimised, when compared to the state of the art, as far as weight, reliability, sound reflection, design size, flow resistance, odour dissipation, and water- and energy consumption are concerned. By arranging the shut-off valve in the form of a first closing device downstream of the urinal bowl drain, transmission of odours (odour seal) from the system or from the pipelines to the surroundings can be prevented.

According to an embodiment of the invention, a drain system is provided, wherein the drain pipe system comprises a third pipe section that leads between the first closing device and the second closing device into the drain pipe system.

In other words, the system can comprise a urinal bowl with a drain that is connected to a drain conduit, and a bypass conduit into which the drain conduit leads, and which bypass conduit can be connected to a vacuum system by way of a suction valve. In this arrangement, the bypass conduit can be connected to the drain conduit by way of a coupling. In this way the suction behaviour is significantly enhanced without the need for air having to be sucked from the toilet bowl.

Furthermore, a flushing-water supply device can be provided which during a flushing process feeds flushing water to the urinal bowl by way of a flush valve.

According to an embodiment of the invention, the drain system furthermore comprises a first fill-level measuring device for measuring a fill level between the first closing device and the second closing device.

This fill-level measuring device can be used for controlling a suction process, for example in order to initiate suction or intermediate suction when a certain fill level has been reached.

According to an embodiment of the invention, the drain system further comprises a second fill-level measuring device for measuring a fill level upstream of the first closing device.

This second fill-level measuring device can also be used for controlling the suction process, for example in order to interrupt intermediate suction and in order to re-open the first closing device in order to prevent overflowing of the bowl.

According to an embodiment of the invention, in the drain system the first closing device and the second closing device are arranged in a housing.

This makes possible a compact design and a lightweight design that is important for use in aircraft.

According to an embodiment of the invention, in the drain system the first closing device and the second closing device are mechanically coupled.

Mechanical coupling makes possible reduced malfunction with otherwise possible contradictory selection of the closing devices. Furthermore, it is possible for both closing devices to provide only a single, and therefore lighter, drive device. Moreover, mechanical coupling reduces the failure probability when compared to two electrically controlled valves.

According to an embodiment of the invention, the first closing device is a first gate shut-off valve, and the second closing device is a second gate shut-off valve.

Shut-off valves are valves that are easy to operate and allow simple mechanical coupling with a lightweight design.

According to an embodiment of the invention, the first and the second gate shut-off valves comprise a shared shut-off plate.

In this way mechanical coupling is ensured, and, furthermore, components and thus weight are saved.

According to an embodiment of the invention, in the drain system the shut-off plate is rotatably held and a port opening is provided such that only one gate shut-off valve can be open. However, it is also possible to provide a shut-off plate that with the use of a motor is moved to and from in a linear manner by means of a cam.

Depending on the existing installation space, both the rotatable shut-off plate and the slidable shut-off plate have their advantages: the rotatable plate has no unbalanced mass during movement; while the plate that is movable in a linear manner requires less installation width.

According to an embodiment of the invention, in the drain system the shut-off plate is driven by means of a motor. If necessary, a gear arrangement can also be provided.

A motor can be selected with various torques, and can still close the closing device even in cases where the movement of said closing device is restricted by dirt.

According to an embodiment of the invention, the drain system further comprises a control device that is designed to control the first closing device and the second closing device based on at least one state from the group of a first fill-level measuring device between the first and the second closing device, a second fill-level measuring device upstream of the first closing device, an exterior actuation device and a time-control unit.

By means of the control system a malfunction can be avoided by intelligent monitoring of the system without this leading to serious malfunctions such as overflowing in various sections, or after a certain period of time has lapsed when no other triggering criterion has been reached, flushing and suction is initiated. The flush valve, shut-off valve and the suction valve can be controlled by the control unit with a delay in time.

According to an embodiment of the invention, in the drain system the connection of the third pipe section is connected to at least one device from the group comprising an odour seal and a silencer.

One end of the bypass conduit or of the third pipe section can be connected to a suction valve, while the other end is connected to an odour seal. This is to prevent unpleasant odours from emanating from the bypass conduit to the outside. The end of the bypass conduit that supplies ambient air can comprise a silencer, as a result of which only low perceivable sound emissions on the bypass conduit are caused. By combining the bypass conduit with a silencer it is further possible to cause low perceivable noise emission at the bypass conduit. Active noise abatement can take place with a reflection- or absorption silencer.

The propagation of remaining noise emission emanating from the silencer can be further reduced in that the silencer is arranged behind a noise-abating lining, and the quantity of air is not sucked in from the toilet set-up but instead from surroundings that are separate from the place of installation of the vacuum toilet.

According to an embodiment of the invention, a vacuum toilet comprises a drain system according to the invention.

According to an embodiment of the invention, a vacuum urinal comprises a drain system according to the invention.

According to an embodiment of the invention, an aircraft comprises a toilet or a urinal with a drain system according to the invention.

According to an embodiment of the invention, a method is provided for operating a drain system for a vacuum toilet for an aircraft, with the method comprising providing a first closing device that is provided in a first pipe section of a drain pipe system, and a second closing device that is provided in a second pipe section of the drain pipe system, downstream of the first closing device, wherein a connection of the first pipe section can be connected to a bowl of a vacuum toilet, and a connection of the second pipe section can be connected to a vacuum system; closing the second closing device and opening the first closing device; closing the first closing device and opening the second closing device, wherein in each case only one of the first and the second closing devices is open.

The individual characteristics can also be combined.

The description of the device also relates to a corresponding method, program element and storage medium.

These and other aspects will be clarified with reference to the drawings described below.

BRIEF DESCRIPTION OF THE DRAWINGS

Below, exemplary embodiments of the drawing are described with reference to the drawings.

DETAILED DESCRIPTION

Figure 1:
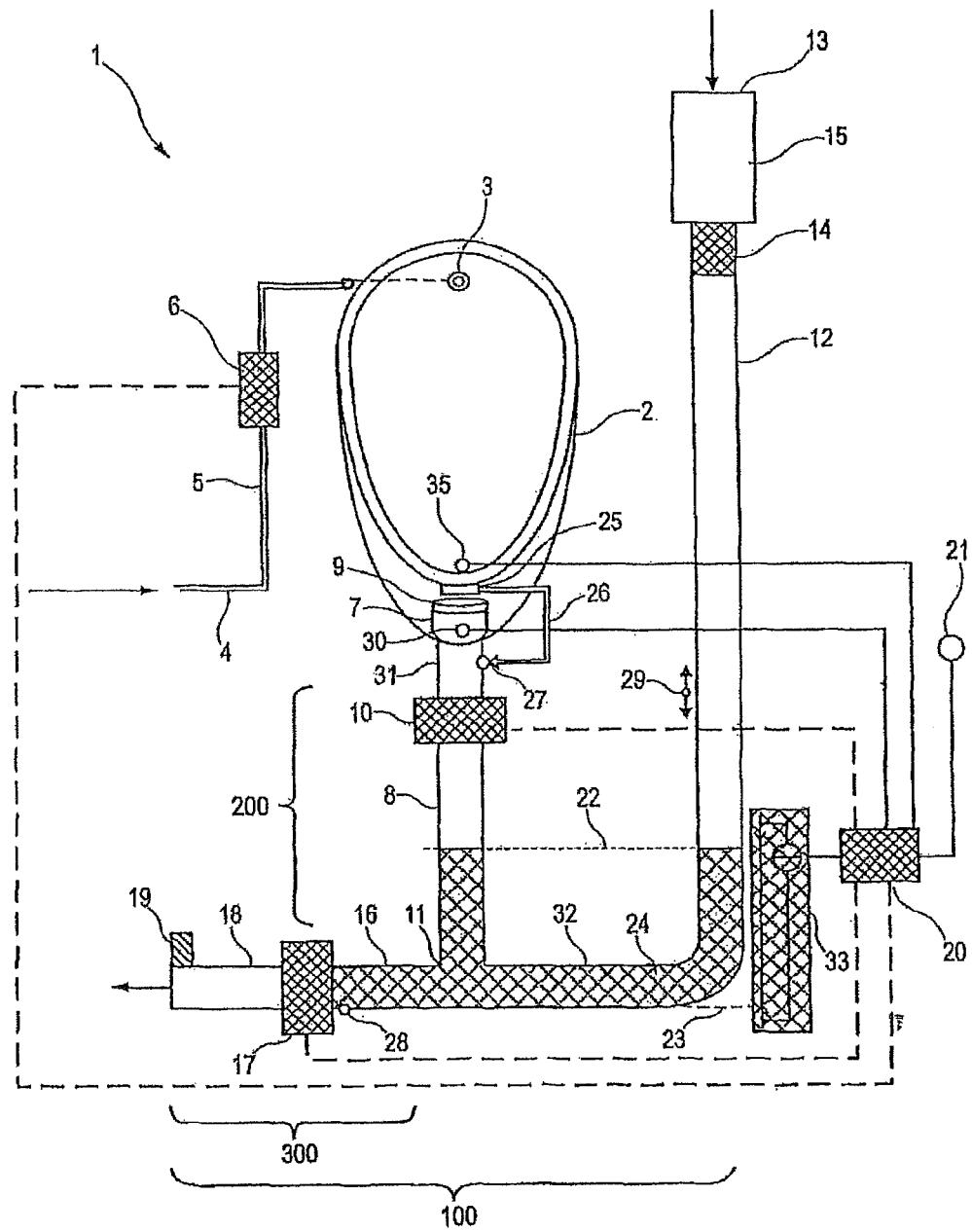
FIG. 1 shows a system for flushing a vacuum toilet according to an exemplary embodiment of the invention.

FIG. 1 shows a system 1 for flushing a vacuum toilet. The vacuum toilet comprises a urinal bowl 2 with a flush ring or flush jet(s) 3. Expediently the flush ring 3 or the flush jet(s) is/are arranged in the region of an upper delimitation, in perpendicular direction, of the urinal bowl 2. Flushing water is supplied to the flush ring 3 or the flush jet(s) by way of a flushing-water supply conduit 4, a flush conduit 5 and a flush valve 6 when the flush valve 6 is opened. In a flushing process the flush valve 6 is opened and flushing water is sprayed into the urinal bowl 2 by way of a flush ring or flush jet(s) 3.

When the flush valve 6 is in its closed state, no flushing water is supplied to the flush ring 3 or flush jet(s).

As shown in FIG. 1, the urinal bowl 2 comprises a drain 7 that is connected to a drain conduit 8. According to this exemplary embodiment, downstream of the drain 7 of the urinal bowl 2 a sieve 9 and a shut-off valve are provided that also fulfil the function of an odour seal. Other devices for separating conveyed matter that must not reach the drain conduit of the urinal bowl 31 from the urinal bowl 2 can be used.

By way of a coupling 11 the drain conduit 8 discharges into a bypass conduit 12. As shown in FIG. 1, the bypass conduit 12 has a predetermined incline in order to transport conveyed matter, urine and flushing water contained therein in the direction of the end of the bypass conduit 12 to the suction valve 17 by way of gravity. The end 13 of the bypass conduit 12, which end 13 points to the surroundings, comprises an odour seal 14 and a suction silencer 15. The odour seal 14 and the suction silencer 15 are located above the coupling 11. According to the exemplary embodiment, the arrangement of the suction silencer 15 and of the odour seal 14 is such that an air inlet opening of the suction silencer 15 and of the odour seal 14 is above the maximum possible liquid level. The odour seal 14 is arranged downstream of the suction silencer 15.

Downstream of the coupling 11 the other end 16 of the bypass conduit 12 discharges into a suction valve 17. The suction valve 17 is connected to a waste water conduit 18. The waste water conduit 18 is connected to a vacuum system 19 which generates a vacuum and in the waste water conduit 18 generates a suction stream when the suction valve or the closing device 17 is opened. The suction valve 17 can be opened and closed, and in its open state generates a suction stream in the bypass conduit 12, in particular with the shut-off valve 10 in its closed position.

As shown in FIG. 1 by the dashed lines, the suction valve 17, the shut-off valve 10 and the flush valve 6 are controlled by a control unit 20. The control unit 20 is connected to a sensor 30. A triggering device 21, if applicable manually operated, which is connected to the control unit, can also be used, but this is not mandatory for proper functioning. The triggering device 21 can be a control button that can be activated by a person using the vacuum toilet, in order to trigger the flushing process and subsequently the suction process. Triggering can also take place by means of a time-control unit 87, for example if no other triggering condition is present. The time-control unit can be provided either externally or within the control unit. In the case of the time-control unit being provided within the control unit, the timings can also be implemented by way of software.

As an alternative, the flushing process can be triggered automatically with the use of a corresponding sensor 30. Flushing can be triggered by detection via a sensor 30 prior to use, when stepping away, prior to use and when stepping away, or when the urinal cover is being closed (functions like the triggering device 21). The duration of flushing, in other words the quantity of flushing water used, can be set so as to be fixed, for example to approximately 3 seconds, and can be controlled according to the duration of use of the urinal, according to the quantity of liquid received by the urinal, and/or according to the conductivity of the urine/water mixture. The duration of use can be measured by way of a sensor 30 that registers the period of time between a person stepping close to the urinal and stepping away from the urinal. The sensor 30 can be a user registration sensor, for example a movement sensor, temperature sensor, distance sensor or a photoelectric barrier. The installation position, angle of view/focal length of the sensor, and its sensitivity should be determined such that the direct user of the urinal is registered. The quantity of liquid discharged into the urinal can be measured at the fill level in the intermediate storage device 32. The higher the fill level the longer the duration of flushing or the larger the quantity of flushing water required in order to achieve a good rinsing effect in the soiled urinal bowl. Measuring the fill level can take place with the use of pressure sensors (measuring the hydrostatic pressure), capacitive fill level sensors, and/or optical fill level sensors. Further measuring methods are also imaginable, depending on demands and requirements. Furthermore, in the intermediate storage device 24 the conductivity of the liquid (urine/water mixture) can be measured. The greater the conductivity and thus the saline content of the liquid (urine/water mixture), the longer the required duration of flushing and thus the larger the quantity of flushing water needed in order to increase the cleaning effect in the urinal bowl and in order to reduce deposits. This can be registered using a urine/water mixture conductivity sensor that is arranged in the drain region, for example, of a urinal. As far as the selection of materials and the geometry (construction) are concerned, the intermediate storage device 32 can be designed such that measuring through the wall of the intermediate storage device is possible. The different methods of determining the flushing quantities can be combined at will so that flushing according to requirements can be achieved.

In a supplementary manner the geometry of the urinal bowl should support gravity-driven drainage of the liquids from the surface of the urinal bowl. Furthermore, an anti-adhesive surface coating can be used in the urinal bowl so as to improve the draining behaviour.

According to another exemplary embodiment of the invention, the system can also be operated as a "waterless urinal". It is possible that the devices concerning flushing 3, 4, 5 and 6 may then not be required.

According to one embodiment, after the definition of the flushing quantity, the control unit 20 is activated. The control unit 20 determines switching-on times of the flush valve 6, shut-off valve 10 and suction valve 17.

According to the exemplary embodiment shown in FIG. 1, the shut-off valve 10 is opened by way of a sensor 30 when the user steps close to the urinal. If this sensor is not provided, urine flows to the closed shut-off valve 10. The shut-off valve must remain closed before the user steps close to the urinal so that no unpleasant odours can emanate from the urinal. In this case the drain conduit from the urinal bowl 31 should be equipped with a fill-level measuring device similar to the fill-level measuring device 33 in the intermediate storage device 32 so as to prevent overfilling of the drain conduit from the urinal bowl 31. When a maximum fill level in the drain conduit of the urinal bowl 31 has been reached, the shut-off valve 10 should automatically be opened in order to prevent overfilling of the drain conduit from the urinal bowl 31 and consequently overfilling of the urinal bowl. As a result of the open shut-off valve 10 a storage device expansion by the effectively usable storage device volume 24 can take place.

If a sensor is present, the shut-off valve 10 is automatically opened when the user steps close to the urinal, and the liquids can flow into the intermediate storage device 32.

As an alternative, when the user steps close to the urinal the shut-off valve 10 can remain closed in order to prevent any unpleasant odour emanating from the drain conduit from the urinal bowl 31 during use. In this case, again, fill level measuring in the drain conduit from the urinal bowl 31 with automatically opening shut-off valve 10 and, if required, a storage device expansion by the effectively usable storage device volume 24 is sensible.

After use of the urinal, flushing can be manually activated and triggered by the triggering device 21, or automatically in that the user steps away from the urinal. As a result of the flush valve 6 opening for the defined duration of flushing, flushing water is let into the urinal bowl 2 and any impurities that are present are conveyed, by way of the sieve 9, to the intermediate storage device 24 or to the shut-off valve 10. The liquid and any matter to be conveyed are conveyed in a gravity-driven manner by way of the conduits 31, 8 and 16, which have to maintain a gradient, right up to the suction valve 17. The shorter the flushing process the shorter the acoustic exposure (noise) to the passenger in the toilet and to the passengers in the cabin. If a urinal bowl made of stainless steel is used, noise generation as a result of structure-borne sound or air-borne sound is particularly pronounced and can primarily be reduced by means of a reduction in the flushing time. For hygiene reasons a minimal duration of flushing for adequate rinsing of the urinal bowl should be set. By means of a variable duration of flushing, flushing water weight can be saved. This results in reduced fuel consumption as a result of a reduction in fresh water that has to be carried along. As an alternative, if the same quantity of flushing water is carried on board, the water saved by variable duration of flushing water, when compared to constant duration of flushing, over a given number of flushing processes can be made available to other on-board devices, for example to a shower. Further suppression in structure-borne sound can be achieved by sound absorption on the urinal bowl 2. Sound absorption mats are, for example, glued to the underside of the urinal.

The suction valve 17 is closed until the point in time of activation. In the case of manual activation by way of the triggering device 21 and non-existing fill level measuring in the drain conduit from the urinal bowl 31 with automatic triggering of the shut-off valve 10, firstly the shut-off valve 10 has to be opened for a defined period of time so that the banked-up liquid can flow into the intermediate storage device 32. In order to prevent unpleasant odours arising upstream of the shut-off valve 10 the maximum fill level 22 in the intermediate storage device 32 should not be exceeded. When the maximum fill level is reached, a reduced automatic suction process of the liquid down to the minimum fill level 23 can take place. In this suction process the suction valve 10 should only be opened to such an extent that the flow sounds at the urinal drain 7 are not excessive.

The shut-off valve 10 is then closed completely, and subsequently the suction valve 17 is opened after a defined time.

Due to a pressure difference generated by the vacuum system 19, the air from a sound-insulated secondary structure chamber (sound insulation wall) then flows through the bypass conduit 12 into the intermediate storage device 32 and conveys the liquid and the material that is conveyed with it to the vacuum system 19. As a result of the airstream in the bypass conduit 12, a closed, for example spring-loaded, odour seal 14 is opened in the direction of flow. After the suction process the spring-loaded odour seal 14 closes again, and unpleasant odours cannot leave the upper end of the bypass conduit 13. The flaps of the nonreturn valve 14 (possibly a butterfly) comprise a special sealing ring all around so as to improve the sealing ability and to prevent arising odours from emanating.

The air supply to the suction valve 17 is sound attenuated by a silencer 15 so that noise emission is suppressed at this point.

The opening duration or the duration during which the suction valve 17 is switched on can be set so as to be fixed (for example one to four seconds) or it can be adjusted to reflect the fill level in the intermediate storage device 32. The method of fill level measuring should be selected such that an adequate number of fill level heights or measuring values can be provided. In this way the duration of the suction process can be set as required, depending on the fill level height. The shorter the suction process, i.e. the lower the fill level in the intermediate storage device 32, the shorter the acoustic disturbance (noise) to which the passenger in the toilet and the passengers in the cabin are exposed. The shut-off valve 10 and the suction valve can also be replaced by a pneumatic or electromechanical pinch valve so as to further reduce flow noises. An automatic flushing and suction process after each use of the urinal is recommended in order to provide the user with feedback of successful use with rinsing. The design of the intermediate storage device 32 can incorporate this aspect. Advantageously, the closing speeds of the valves are such that minimum flow noises are generated. Advantageously, all the conduits are arranged with gradients towards the vacuum system 19, which gradients ensure optimal drainage function.

Figure 2:
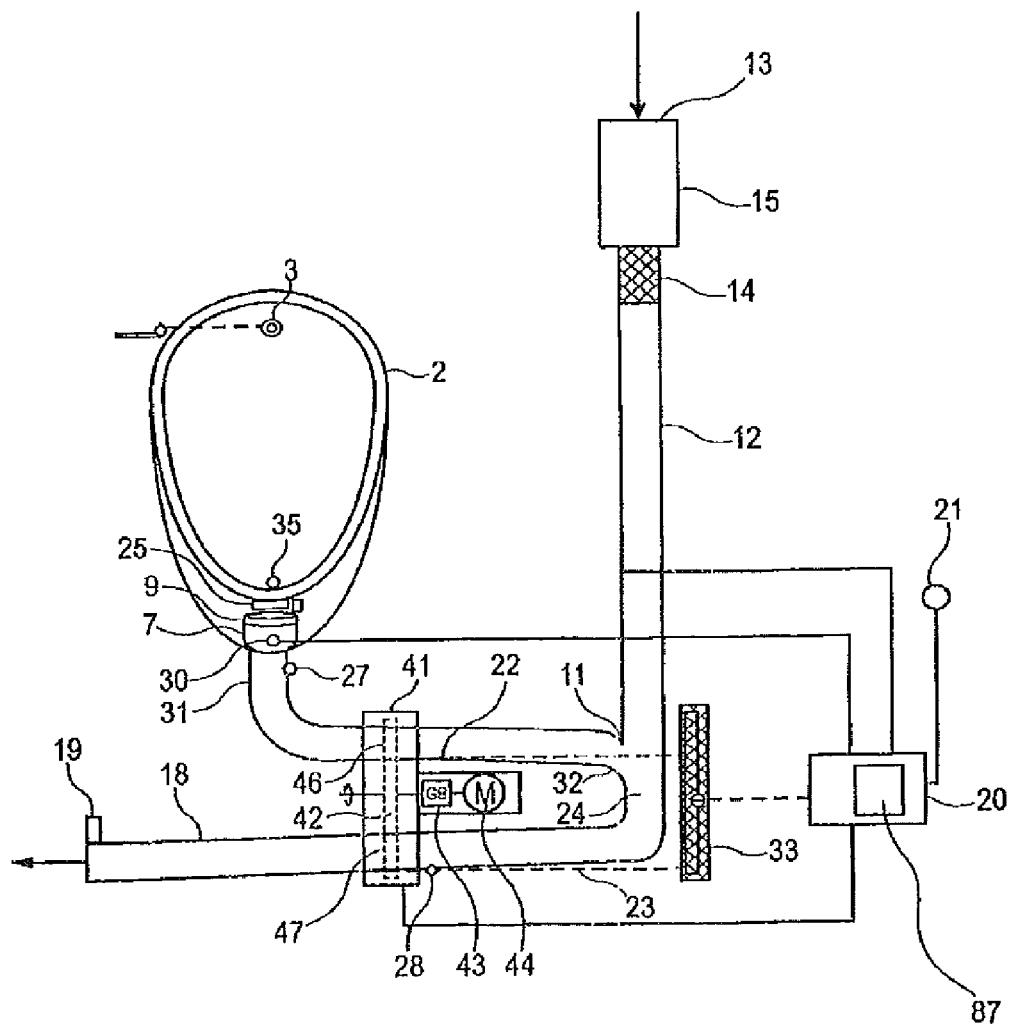
FIG. 2 shows a system for flushing a vacuum toilet according to a further exemplary embodiment of the invention.

In order to prevent overfilling of the urinal bowl 2 in the case of a blocked sieve 9 or a defective shut-off valve 10, an overflow 25 with an inlet of the liquid into the intermediate storage device is sensible. Various inlet positions in the system according to FIGS. 1 and 2 are imaginable. The overflow 25 can optionally comprise a sieve in order to prevent downstream installations and the overflow conduit from becoming blocked as a result of coarser particles. The use of a sieve depends on the design of the overflow 25 and of the overflow conduit 26. Furthermore, it should be ensured that unpleasant odours from the pipe architecture cannot leave the system by way of the overflow conduit 26 and the overflow 25.

Letting the liquid in at position 27 is possible with fill level measuring in the intermediate storage device, in the drain conduit or in the urinal bowl 31 and with an adequately dimensioned intermediate storage device. The pipe cross section of the drain conduit at the urinal bowl 31 must make it possible to vent the intermediate storage device. With a continual flow of liquid into the urinal bowl, fill level measuring should be provided which when the maximum fill level of the intermediate storage device has been reached opens the shut-off valve 10 and provides a storage device expansion by the effectively usable storage device volume 24. When the maximum fill level 22 has been reached, the suction process, which involves closing the shut-off valve 10 and opening the suction valve 17, is activated. The storage device volume 32 and 31 can be designed to reflect the maximum possible volume flow in the overflow conduit 26. To provide an odour seal, installations such as a ball-type odour seal, membrane odour seal etc. in the overflow conduit 26 are possible.

Letting the liquid in at positions 28, 29 is possible in the same manner as at position 27. It should be taken into account that during a suction process air can also be drawn from the overflow 25. Flow sounds can be prevented by means of a ball-type odour seal. Furthermore, by designing the flow resistances from the overflow conduit 26 to the bypass conduit 12 the resistance, in other words the pipe cross section and the pipe length, can be adapted such that the low flow speed in the overflow conduit 26 also generates only low sound emissions.

A further measure of preventing the urinal bowl 2 from overflowing when the sieve 9 and/or the overflow 25 are/is blocked involves automatic closing of the flush valve 6 when a maximum fill level in the urinal bowl has been registered. Registration can be implemented with the use of a fill level sensor 35, as used in the fill-level measuring device 33, at the intermediate storage device 32.

The system can also be operated as a "waterless urinal". In that case, positions 3, 4, 5 and 6 concerning flushing are not required. The geometry of the urinal bowl should support gravity-driven draining of liquids at the surface of the urinal bowl. Furthermore, an anti-adhesive surface coating to support the draining behaviour should be used in the urinal bowl.

FIG. 2 shows a further advantageous design of an embodiment of the invention. According to this embodiment, it is also possible to combine the shut-off valve 10 and the suction valve 17 to form a combination disc valve 41 (compare FIG. 2 to FIG. 4). The suction process can take place in a time sequence as is the case with the shut-off valve 10 and the suction valve 17. By way of a motor 44 and if need be a gear arrangement 43 the valve disc 42 is rotated, for example by 180°. Due to the design this results in two valve states (compare FIG. 3 and FIG. 4).

Figure 3:
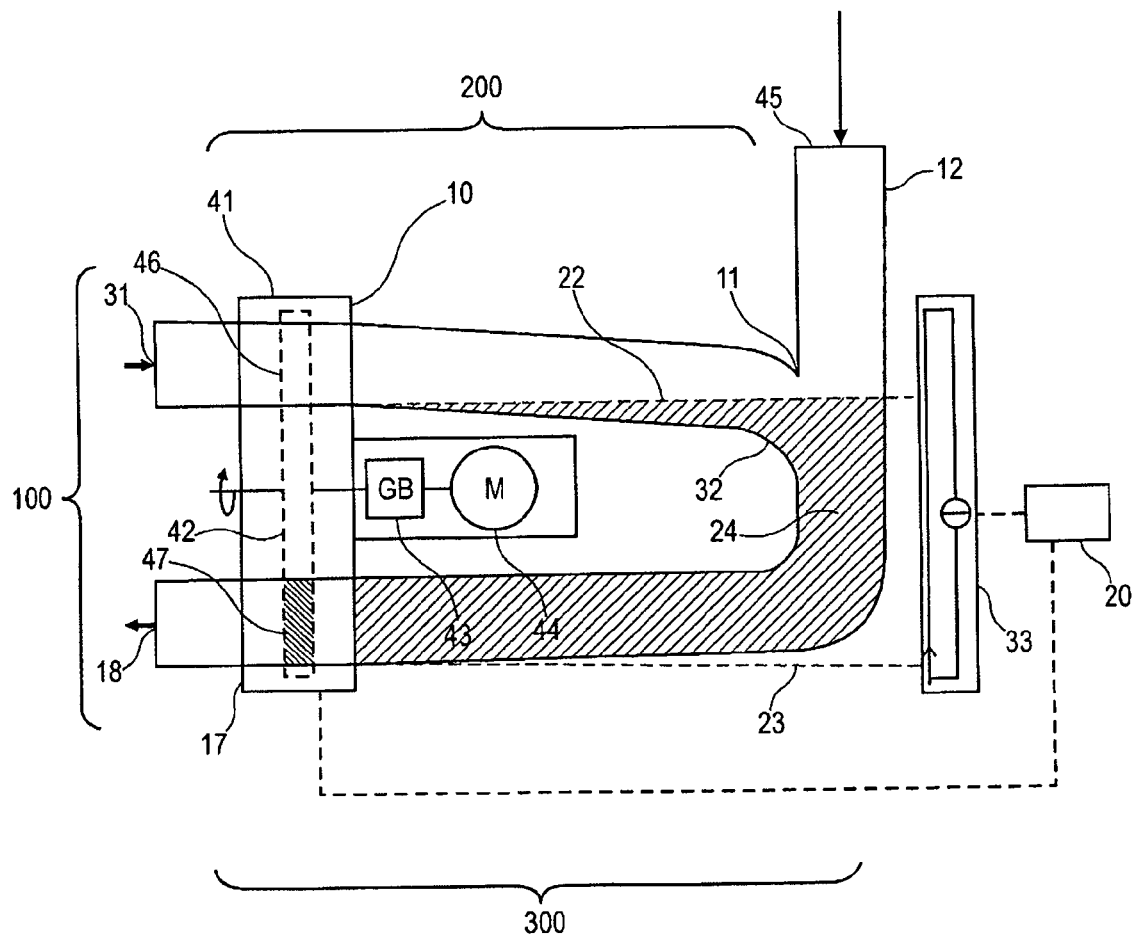
FIG. 3 shows a drain system for flushing a vacuum toilet according to an exemplary embodiment of the invention in a first state.
Figure 4:
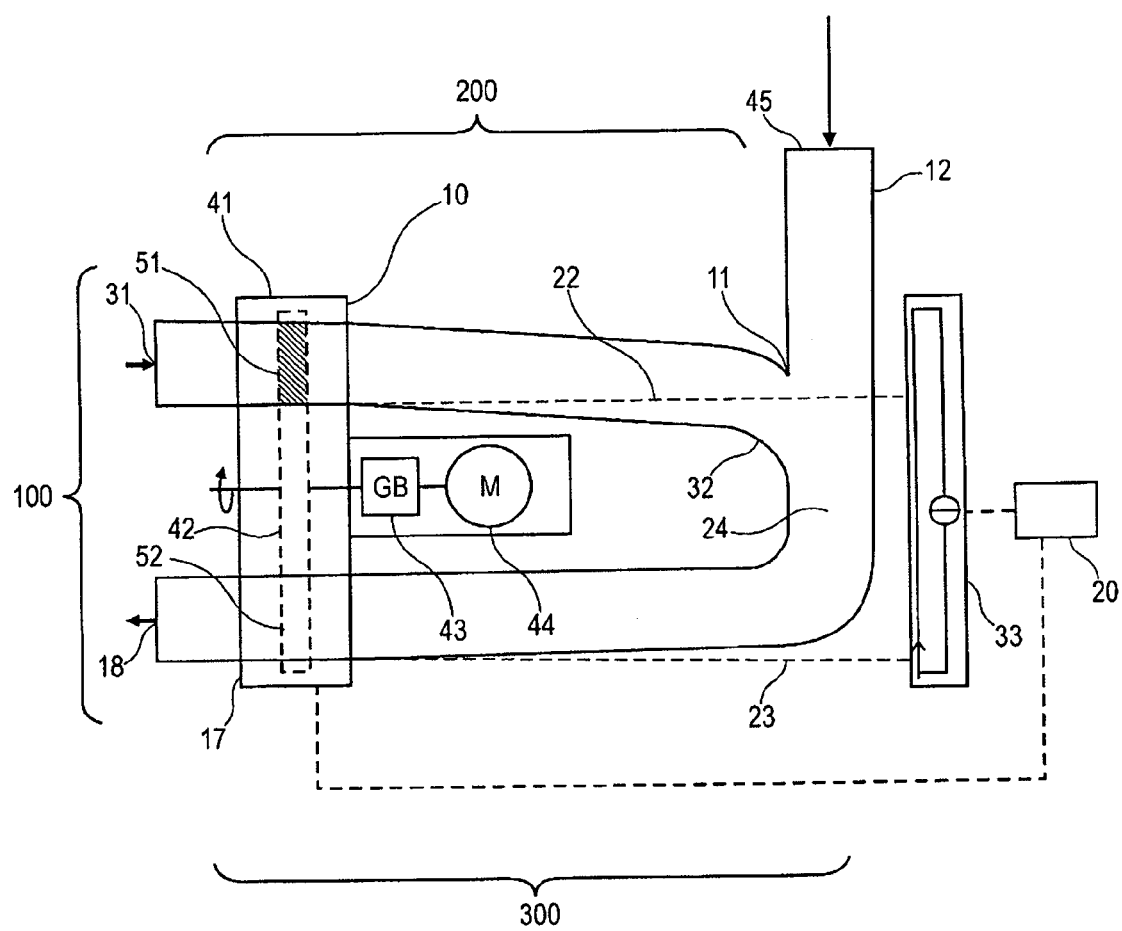
FIG. 4 shows a drain system for flushing a vacuum toilet according to an exemplary embodiment of the invention in a second state.

FIG. 3 shows a first state of the closing elements or of the valves. In a first state the valve inlet is fully open 46 and the valve outlet is fully closed 47. In this state the intermediate storage device can be filled without there being suction into the vacuum system 19. In a second state the valve inlet is fully closed 51 and the valve outlet fully open 52 for emptying the intermediate storage device into the vacuum system 19. FIG. 4 shows a second state of the closing elements or of the valves. As is the case in system 1, the air for suction is obtained from the bypass conduit 12 by way of the suction silencer 15 and the odour seal 14. If required it is also possible to set intermediate states with the combination disc valve 41. If the valve inlet is 100% closed 51, the valve outlet can be opened from 0% to 100%. Conversely, the valve outlet can be closed 100%, 47, wherein the valve inlet is opened between 0% and 100%. This is achieved by arranging the pipes on the valve disc with a port 42.

A combination disc valve provides an advantage as a result of its compact design, lower weight and greater reliability when compared to two valves. As a result of its lighter weight, here again a contribution can be made to reducing fuel consumption. The compact design makes it possible to integrate the component in confined design spaces. Reliability can be improved by reducing the number of electrical and mechanical sub-components. A combination disc valve comprises only approximately half the mechanical and electrical sub-components when compared to a system with separate valves.

The coupling 11 of the bypass conduit 12 and of the intermediate storage device 32 can be designed so as to be optimised, from the point of view of flow technology, in order to avoid flow sounds, as is shown in FIG. 2 or FIG. 3. The intermediate storage device 32 must be designed with a gradient to the suction opening so as to ensure complete drainage.

Figure 5:
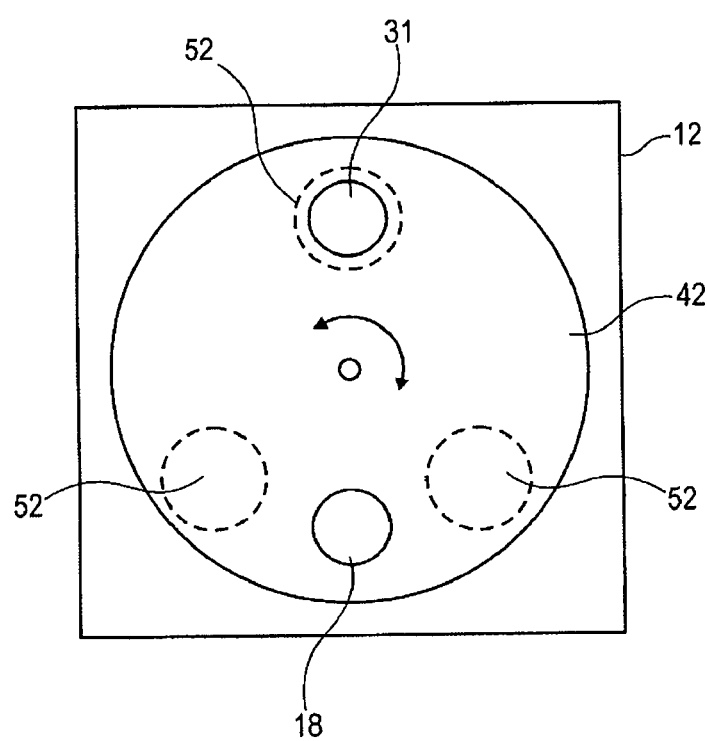
FIG. 5 shows a section view of a housing with two closing devices according to an exemplary embodiment of the invention.

FIG. 5 shows a section view of a combination valve. The valve disc 42 can also comprise a larger number of openings 52, which reduces the angle of rotation for a complete cycle. In this arrangement the positions of the openings should always be selected such that it is not possible to open both valves at the same time, for example in the case of valve ports that are opposite each other at an angle of 180° an odd number of equidistantly distributed openings in the disc. As an alternative, the valve disc can also comprise one or two openings. In the case of one opening the valve disc is advantageously rotated by 180°, and in the case of two openings the positions (angles between the openings) are advantageously less than 180°, as long as the two valves are not open at the same time. As an alternative it is also possible to use a gate shut-off valve that comprises one or several openings and that alternates between two positions so that always only one valve is open.

Figure 6:
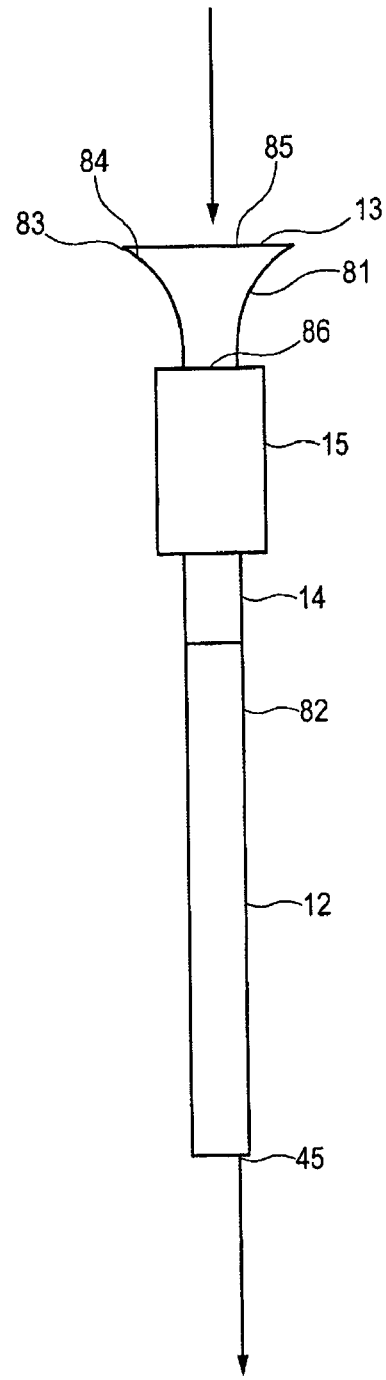
FIG. 6 shows an end of a pipe section of a drain system according to an exemplary embodiment of the invention.

The system 1 according to FIG. 1 can also be operated with a pipe-inlet inlet nozzle 81 that is more favourable from the point of view of flow dynamics. FIG. 6 shows an embodiment of the air inlet at the air inlet end of the third pipe section or on the bypass conduit. Integration of the inflow nozzle in the suction silencer 15 is possible. In order to reduce flow sounds and energy loss at the end of the bypass conduit 13 it is advantageous if sharp-edged openings and high flow speeds are avoided. This can be achieved with the inflow nozzle 81, by the rounded inflow edge 83 and by the rounded inflow opening 84, so as to prevent separation and the formation of turbulence fields. The pipe expansion, which is favourable from the point of view of flow dynamics, through the inflow nozzle 81 causes a reduction in the air inlet speed in relation to the inflow cross sectional area 85 to the bypass conduit cross sectional area 86. The bypass conduit 12 has to be designed according to the requirements of the maximum fill level in the urinal bowl and according to acoustic requirements. With a view to the prevention of noise development in the bypass conduit 12 even slight interference in the flow should be prevented so as to prevent oscillation of the air column in the pipe. An expanded pipe length 82 of the bypass conduit 12 can be matched, as far as the air column in the bypass conduit 12 is concerned, so as to reduce any excitation of harmonic sequences (oscillations) and so as to stop standing waves. Particularly those frequencies should be weakened which are close to the resonance frequency of the air column in the pipe.

Although the invention has been described above with reference to a preferred exemplary embodiment, various alterations and modifications can be made without leaving the scope of protection of the invention.

In principle, the system according to FIG. 1 and FIG. 2 can also be applied in the case of other bowl shapes (bowl designs), for example a toilet bowl. Consequently the urinal bowl is replaced by the other bowl shape and bowl installation position.

The invention can also be used in fields other than that of aviation, for example in trains or ships, where vacuum toilets are also used, and where the problem of reducing noise emission exists. Furthermore, other switch-on times can be set for the suction valve and the flush valve, depending on the dimensioning of the vacuum toilet.

The terms "comprising", "having" etc. do not exclude the presence of other elements. The term "a" or "one" does not exclude a plural number.

Reference characters in the claims are provided for improved legibility; they are not intended to limit the protective scope of the claims in any way.

The invention claimed is:

1. A drain system for a vacuum toilet for an aircraft, the drain system comprising:
   a drain pipe system;
   a first closing device;
   and a second closing device;
   wherein the drain pipe system is provided with at least a first pipe section and a second pipe section that is connected to the first pipe section by way of a coupling;
   wherein a connection of the first pipe section is connectable to a bowl of a vacuum toilet, and a connection of the second pipe section is connectable to a vacuum system by way of the second closing device;
   wherein the first closing device is provided in the first pipe section;
   wherein the second closing device is provided in the second pipe section downstream of the first closing device;
   wherein the first closing device and the second closing device are coupled to each other such that in each instance only one of the first and the second closing devices can be open; and
   wherein liquids and any matter to be conveyed are conveyed from a bowl of a vacuum toilet behind the first closing device by way of the first pipe section right up to the second closing device only by way of the force of gravity when the second closing device is closed.

2. The drain system of claim 1, wherein the drain pipe system comprises a third pipe section that leads between the first closing device and the second closing device into the drain pipe system.

3. The drain system of claim 1, further comprising a first fill-level measuring device for measuring a fill level between the first closing device and the second closing device.

4. The drain system of claim 1, further comprising a second fill-level measuring device for measuring a fill level upstream of the first closing device.

5. The drain system of claim 1, wherein the first closing device and the second closing device are arranged in a housing.

6. The drain system of claim 1, wherein the first closing device and the second closing device are mechanically coupled.

7. The drain system of claim 1, wherein the first closing device is a first gate shut-off valve, and the second closing device is a second gate shut-off valve.

8. The drain system of claim 7, wherein the first and the second gate shut-off valves comprise a shared shut-off plate.

9. The drain system of claim 8, wherein the shut-off plate is rotatably held and comprises a port opening such that only one gate shut-off valve can be open.

10. The drain system of claim 8, wherein the shut-off plate is driven by means of a motor.

11. The drain system of claim 1, further comprising a control device that is designed to control the first closing device and the second closing device based on at least one state from the group of a first fill-level measuring device between the first and the second closing device, a second fill-level measuring device upstream of the first closing device, a user detection sensor, a urine-water-mixture conductivity sensor, an exterior actuation device and a time-control unit.

12. The drain system of claim 1, wherein the second closing device is a suction valve comprising a pneumatic or electromechanical pinch valve.

13. The drain system of claim 2, wherein the connection of the third pipe section is connected to at least one device from the group of an odour seal and a silencer.

14. A vacuum toilet comprising a drain system, the drain system comprising:
   a drain pipe system;
   a first closing device; and
   a second closing device;
   wherein the drain pipe system is provided with at least a first pipe section and a second pipe section that is connected to the first pipe section by way of a coupling;
   wherein a connection of the first pipe section is connectable to a bowl of a vacuum toilet, and a connection of the second pipe section is connectable to a vacuum system by way of the second closing device;
   wherein the first closing device is provided in the first pipe section;
   wherein the second closing device is provided in the second pipe section downstream of the first closing device;
   wherein the first closing device and the second closing device are coupled to each other such that in each instance only one of the first and the second closing devices can be open; and
   wherein liquids and any matter to be conveyed are conveyed from a bowl of a vacuum toilet behind the first closing device by way of the first pipe section right up to the second closing device only by way of the force of gravity when the second closing device is closed.

15. The vacuum of claim 14, wherein the vacuum toilet comprises a vacuum urinal.

16. An aircraft with a toilet or a urinal comprising a drain system, the drain system comprising:
   a drain pipe system;
   a first closing device; and
   a second closing device;
   wherein the drain pipe system is provided with at least a first pipe section and a second pipe section that is connected to the first pipe section by way of a coupling;
   wherein a connection of the first pipe section is connectable to a bowl of a vacuum toilet, and a connection of the second pipe section is connectable to a vacuum system by way of the second closing device;
   wherein the first closing device is provided in the first pipe section;
   wherein the second closing device is provided in the second pipe section downstream of the first closing device;
   wherein the first closing device and the second closing device are coupled to each other such that in each instance only one of the first and the second closing devices can be open; and
   wherein liquids and any matter to be conveyed are conveyed from a bowl of a vacuum toilet behind the first closing device by way of the first pipe section right up to the second closing device only by way of the force of gravity when the second closing device is closed.

17. A method for operating a drain system for a vacuum toilet for an aircraft, comprising:
   providing of a first closing device that is provided in a first pipe section of a drain pipe system, and a second closing device that is provided in a second pipe section of the drain pipe system, downstream of the first closing device, wherein a connection of the first pipe section can be connected to a bowl of a vacuum toilet, and a connection of the second pipe section can be connected to a vacuum system by way of the second closing device, wherein the second pipe section is connected to the first pipe section by way of a coupling;
   closing the second closing device and opening the first closing device;
   closing the first closing device; and
   opening the second closing device;
   wherein in each case only one of the first and the second closing devices is open; and
   wherein liquids and any matter to be conveyed are conveyed from a bowl of a vacuum toilet behind the first closing device by way of the first pipe section right up to the second closing device only by way of the force of gravity when the second closing device is closed.

* * * * *